Feb. 14, 1967  R. J. SCHWARTZ  3,304,537
ACOUSTIC LOGGING APPARATUS WITH SELECTABLE
TRANSMITTERS AND RECEIVERS
Filed March 31, 1964  9 Sheets-Sheet 1

INVENTOR.
ROBERT J. SCHWARTZ

BY
Brumbaugh, Free, Graves & Donohue
his ATTORNEYS

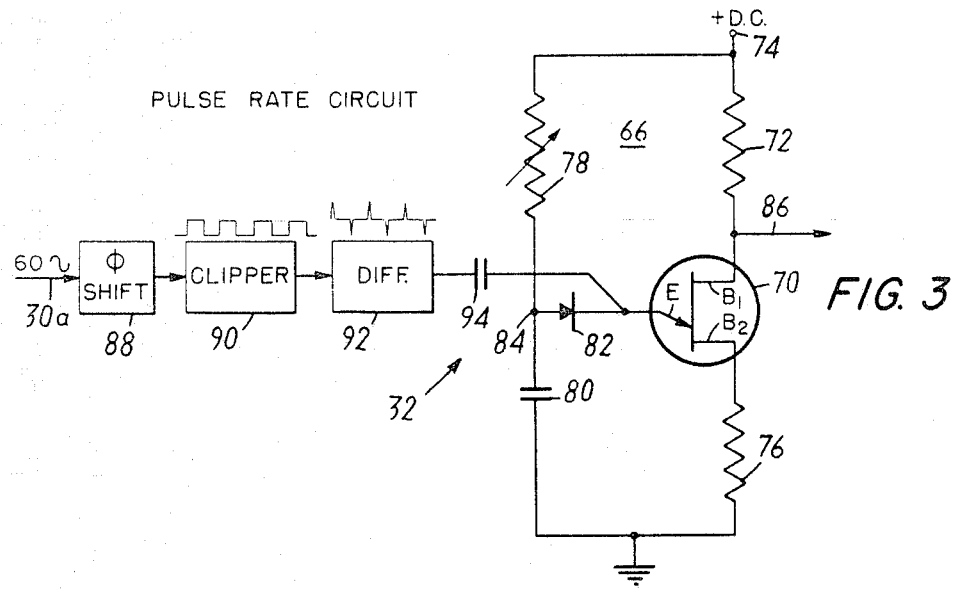
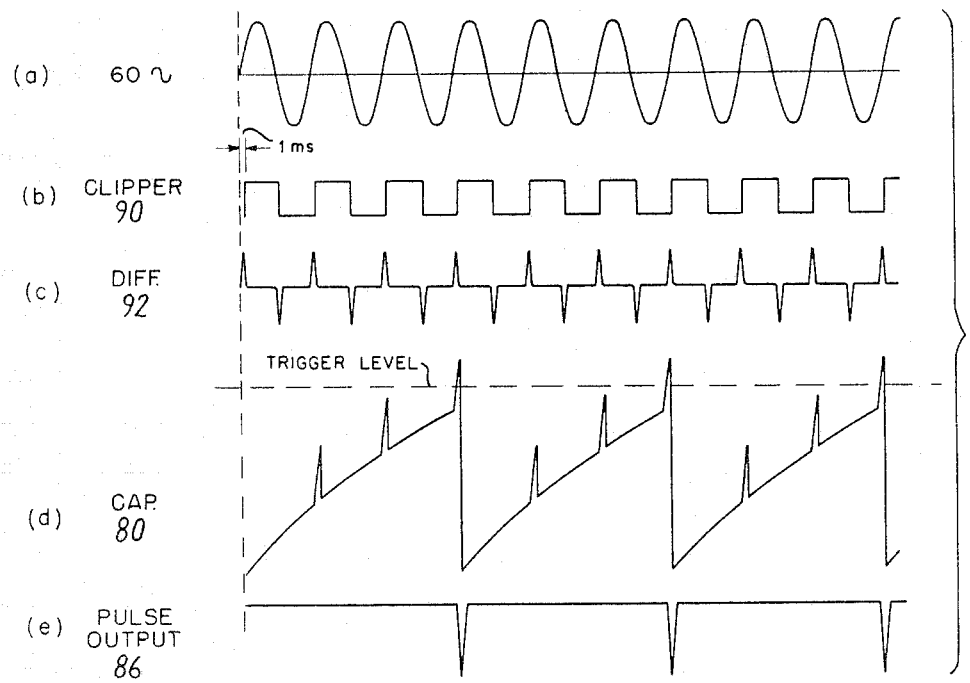

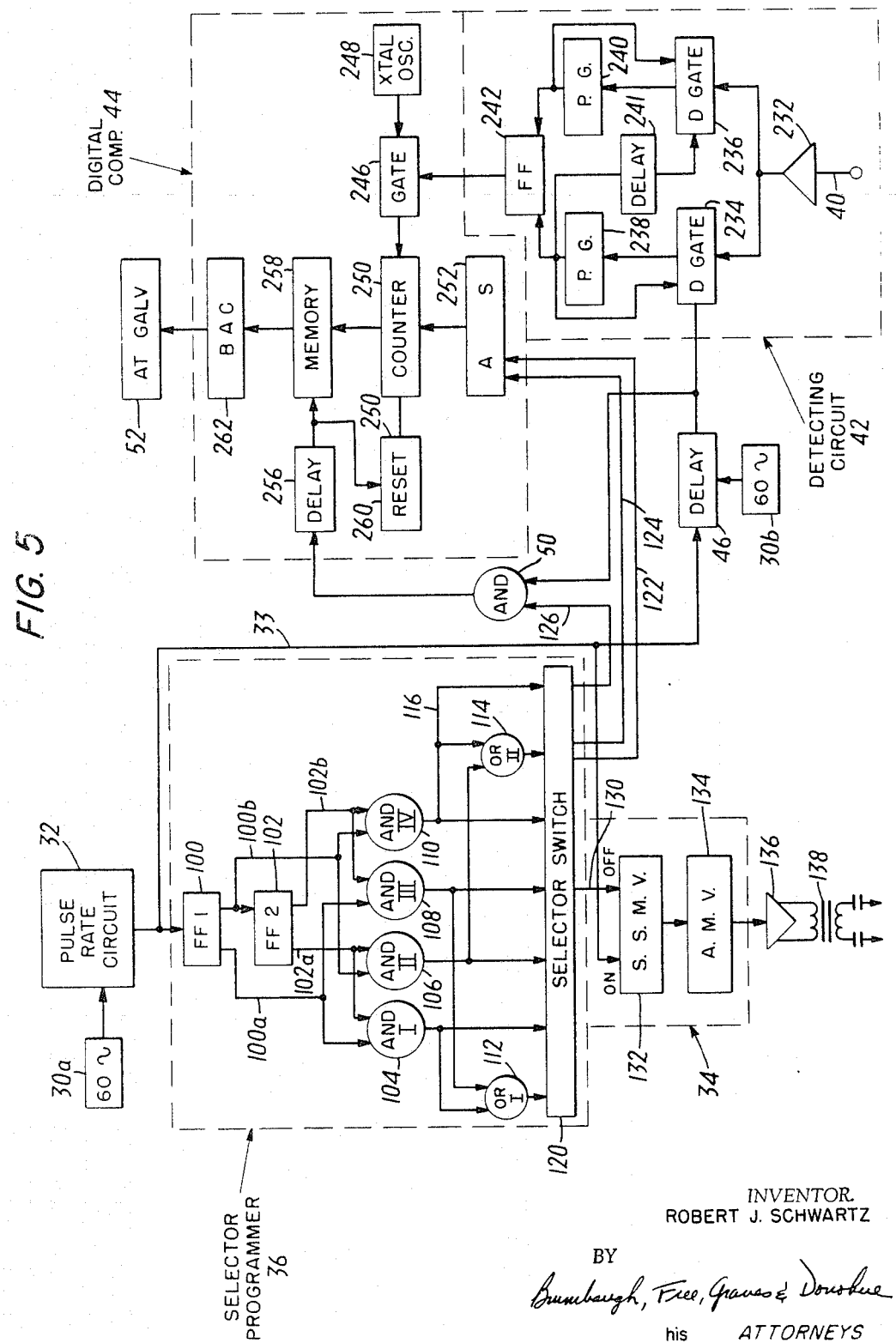

INVENTOR.
ROBERT J. SCHWARTZ

Feb. 14, 1967 R. J. SCHWARTZ 3,304,537
ACOUSTIC LOGGING APPARATUS WITH SELECTABLE
TRANSMITTERS AND RECEIVERS
Filed March 31, 1964 9 Sheets-Sheet 6

INVENTOR.
ROBERT J. SCHWARTZ
BY
Brumbaugh, Free, Graves & Donohue
his ATTORNEYS

INVENTOR.
ROBERT J. SCHWARTZ

Feb. 14, 1967 R. J. SCHWARTZ 3,304,537
ACOUSTIC LOGGING APPARATUS WITH SELECTABLE
TRANSMITTERS AND RECEIVERS
Filed March 31, 1964 9 Sheets-Sheet 8

INVENTOR.
ROBERT J. SCHWARTZ

BY his ATTORNEYS

United States Patent Office 3,304,537
Patented Feb. 14, 1967

3,304,537
ACOUSTIC LOGGING APPARATUS WITH SELECTABLE TRANSMITTERS AND RECEIVERS
Robert J. Schwartz, Houston, Tex., assignor to Schlumberger Well Surveying Corporation, Houston, Tex., a corporation of Texas
Filed Mar. 31, 1964, Ser. No. 356,186
17 Claims. (Cl. 340—18)

The present invention relates to apparatus for making acoustic logs of formations surrounding a well bore and more particularly, to improved systems of this type by means of which greater amounts of information may be obtained with greater accuracy than is possible with known prior art arrangements.

As is well known, the velocity of an acoustic impulse through an earth formation, or conversely its travel times through a given distance in the formation, is indicative of the character of the formation and its components. In general, apparatus for making such acoustic well logs comprises a logging tool or sonde which is adapted to be passed through the well bore, surface equipment for interpreting and recording electrical signals received from the logging tool, and an interconnecting cable which serves both to conduct electrical signals and power between the tool and surface equipment, and also to support the tool during its passage through the bore.

Known acoustic logging tools may contain, for example a pair of acoustic transmitters and a pair of acoustic receivers located along the tool between the transmitters. Appropriate electronic equipment is also located within the tool housing to actuate the transmitters to generate acoustic impulses which are transmitted through the borehole fluid and into the surrounding formations. The receivers respond to acoustic energy transmitted through the formation and the intervening borehole fluid to provide an electrical indication representative of the acoustic energy arriving at the receivers. Electrical signals representative of both the transmitted impulses and the received impulses may be interpreted by electronic equipment within the tool itself or at the surface of the earth to provide velocity and/or travel time indications. As the logging tool moves through the well bore, these indications are recorded as a function of depth in the well to provide a log of the formations.

As can be appreciated, a logging tool must have an overall size sufficiently small with respect to the diameter of the borehole to enable it to pass freely therethrough. Moreover, its length is limited by mechanical and structural requirements. Of necessity, these restrictions impose upon the logging tool limitations as to the maximum length of the tool. These in turn impose rigorous requirements upon the electronic equipment necessary to detect and interpret the electrical signals.

In addition to the limitations presented by the electronic equipment itself, the characteristics of the borehole tend to introduce inaccuracies into the measurements. The acoustic transmitting and receiving transducers are not directly in contact with the formations to be investigated but are separated therefrom by an annulus of borehole fluid. This factor must be accounted for in interpreting the logging signals since the acoustic velocity in the borehole fluid differs from that in the formations and moreover, the interfaces between the fluid and the formations give rise to refraction effects which also introduce inaccuracies into the measurement.

Inaccuracies may also be introduced by the existence of "wash outs" or cavities in the well bore which would change the distance between the acoustic devices on the logging tool and the formation itself. The vertical distance between the acoustic transmitters and receivers will also be affected by changes in the angle of the well bore with respect to the surface of the earth. These inclinations further tend to shift the attitude of the logging tool within the borehole to one side so that the thickness of the borehole fluid layer through which acoustic signals must pass before reaching the formations will be different from the spacing that obtains when the tool is centered in a vertically oriented borehole.

In general, as spacing between receivers increases, detail or resolution of the information obtained decreases. On the other hand, as spacing between receivers decreases, possibility of interference or cross-talk increases. It is desirable, of course, to obtain as acccurate and clearly defined a log of the formations as possible, by taking the measurements over short increments of length of the borehole. However, prior art arrangements, such as disclosed in the Vogel Patent No. 2,708,485 have chosen to employ larger spacings between the acoustic elements, which while perhaps avoiding interference between received signals, do not provide effectively interpretable logs.

Accordingly, it is the principal object of the present invention to provide an improved acoustic logging system which avoids the foregoing shortcomings of prior known arrangements.

It is another object of the present invention to provide improved acoustic logging apparatus which enables the advantages of both small and large spacings between acoustic elements to be enjoyed, while at the same time avoiding the disadvantages normally expected.

Still another object of the present invention is to provide novel acoustic logging apparatus including a plurality of transmitters and receivers mounted in a logging tool, which acoustic elements may be selectively programmed from the surface to provide different measurements.

Briefly, the present invention includes a logging tool in which are mounted, in descending order, a first acoustic transmitter, first, second, third and fourth acoustic receivers, and finally a second acoustic transmitter. These acoustic elements and their associated circuitry are so arranged that the second and fourth receivers are responsive only to acoustic pulses transmitted by the first transmitter, and the first and third receivers responsive to pulses from the second transmitter. Associated with the acoustic elements is a selector mechanism which may be preset to provide a number of different operating sequences of the acoustic elements. For example, within a measurement cycle, the acoustic travel time between the first transmitter and each of its associated receivers and the second transmitter and each of its associated receivers may be measured, giving four distinct measurements within the cycle. Alternatively, the travel times between either of the transmitters and each of its associated receivers may be derived, providing two distinct measurements within a cycle or, finally and most simply, the travel time between a transmitter and one of its associated receivers may be determined.

Signals representative of the travel times thus measured are supplied to a computer at the surface of the earth in which a predetermined arithmetic function is performed thereon, the particular function being correlated with the selected measurement sequence. In the cases of the four and two step measurement cycles, the computed result is indicative of the travel time over a distance through the formations smaller than any individual measurement actually taken. The four step measurement also automatically compensates for errors introduced by the borehole fluid and irregularities in the borehole wall or inclination of the tool. The entire operating cycle is synchronized from a readily available sixty cycle source which controls both the downhole and surface equipment.

The system of the invention includes novel electronic circuitry for use in both the downhole equipment located within the logging tool itself, and on the surface of the earth, whereby the aforementioned logging operations may be reliably performed with a minimum of operator attention.

The foregoing and other objects, features and advantages of the present invention will become apparent from the following detailed description thereof when taken in conjunction with the accompanying drawings in which:

FIGURE 3 is a circuit diagram of the pulse rate circuit, shown in block form in FIGURE 2, and which serves as the master timing source for operation of the entire system;

FIGURE 4 is a series of waveform diagrams useful in explaining the operation of the circuit of FIGURE 3;

FIGURE 5 is a detailed block diagram of the surface electronic equipment of the system;

Figure 8:
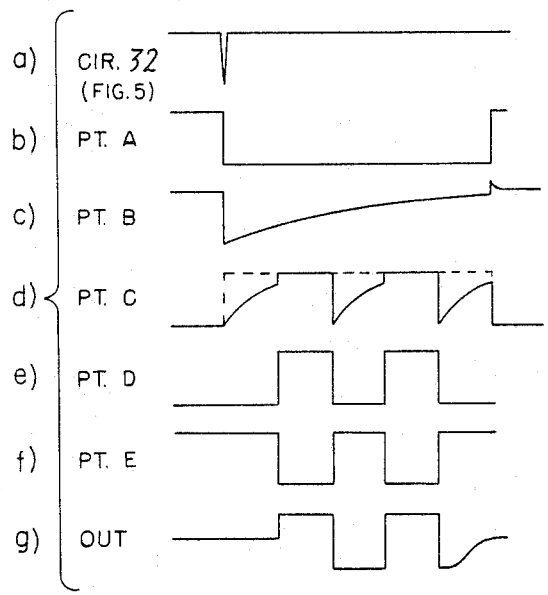
Figure 2:
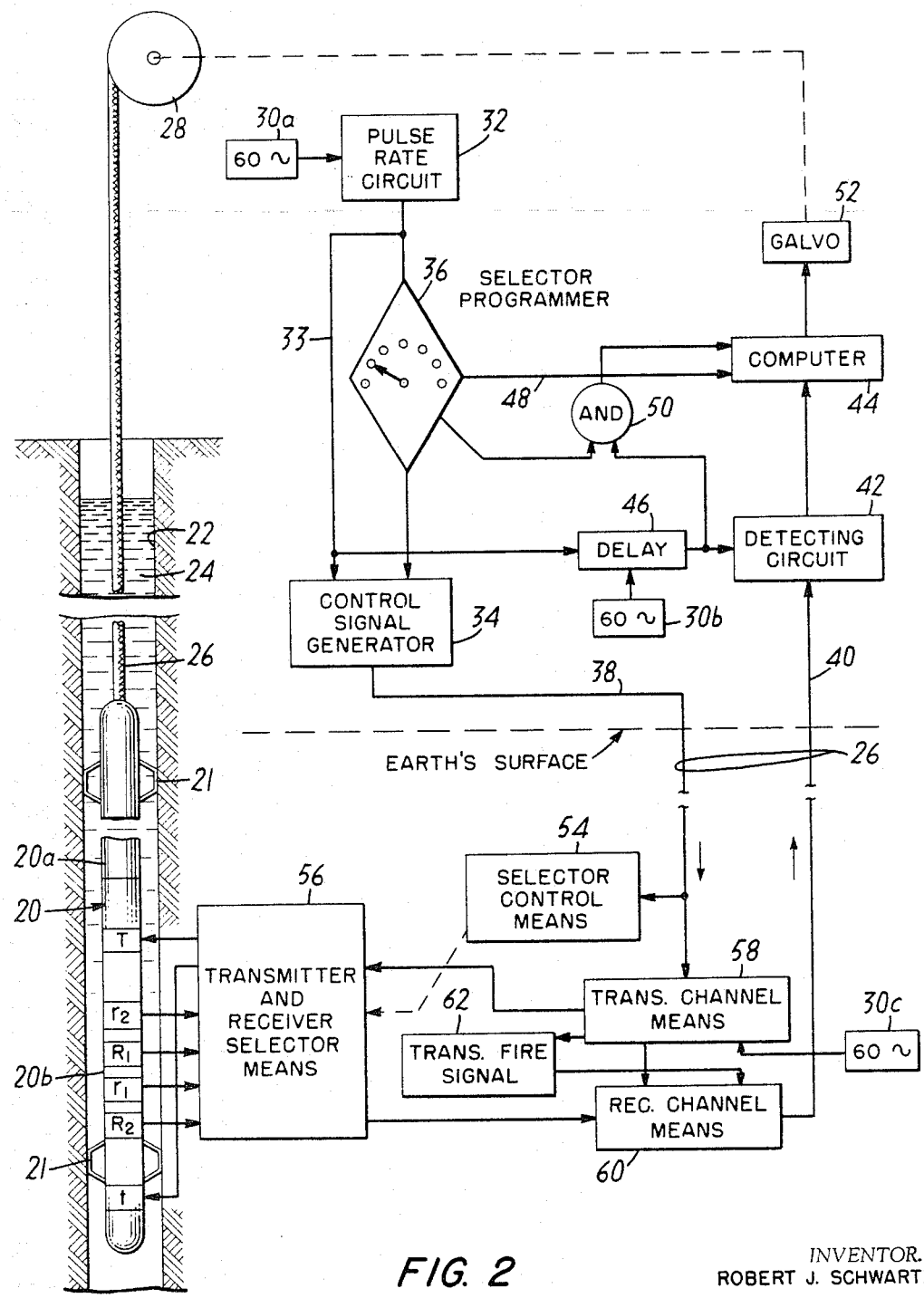
FIGURE 2 illustrates the well logging tool according to the invention in position in a well bore in the earth including, in block diagram form, the electronic circuitry in both the downhole and surface equipment.
Figure 6:
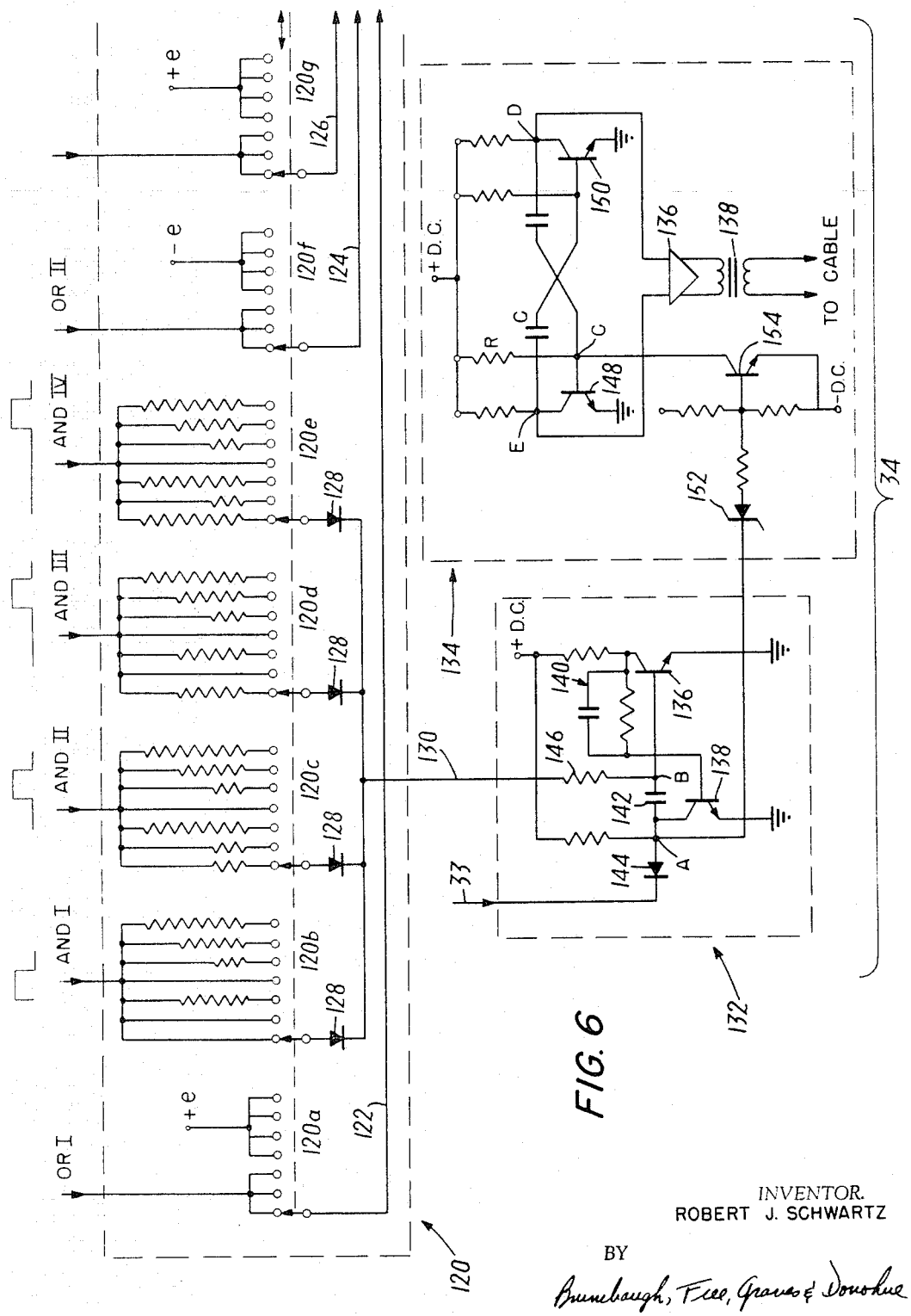
FIGURE 6 is a circuit diagram of a portion of the surface electronic equipment, including the details of the program selector switch.
Figure 7:
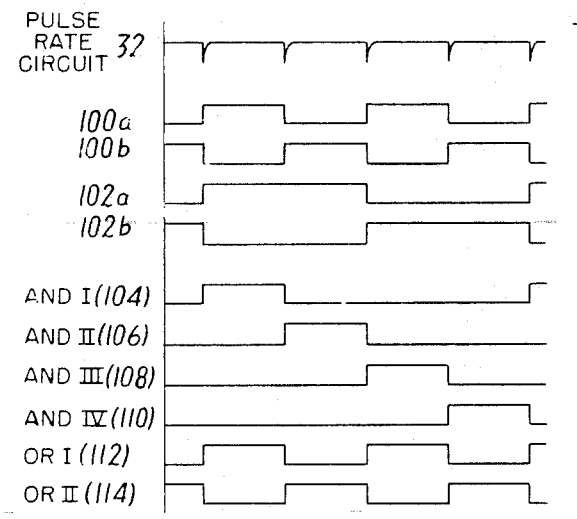
Figure 9:
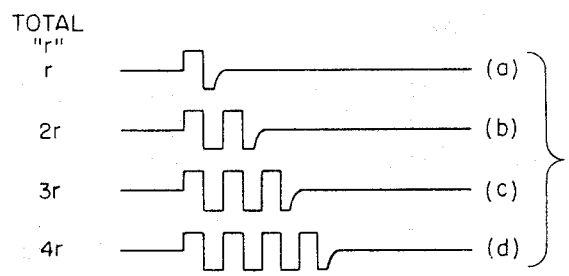
Figure 13:
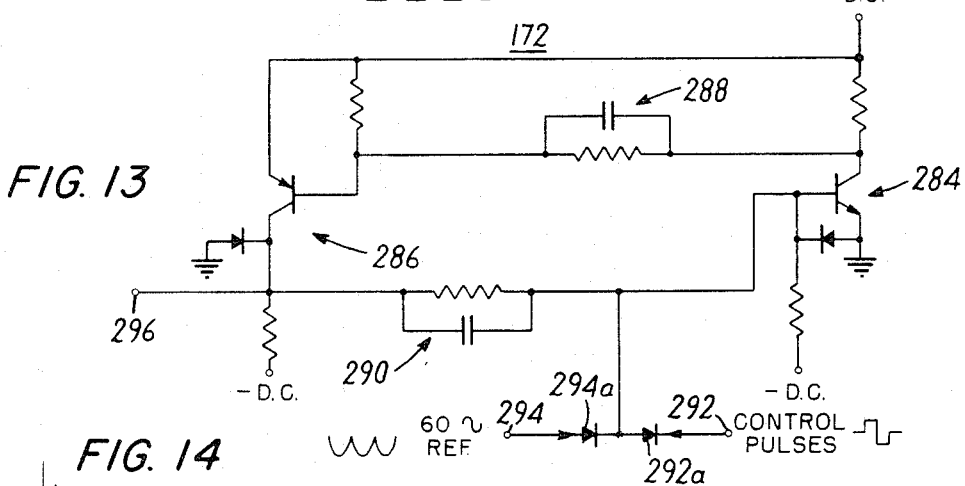
Figure 14:
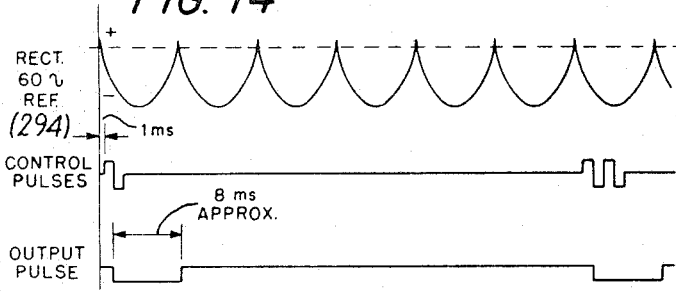
Figure 10:
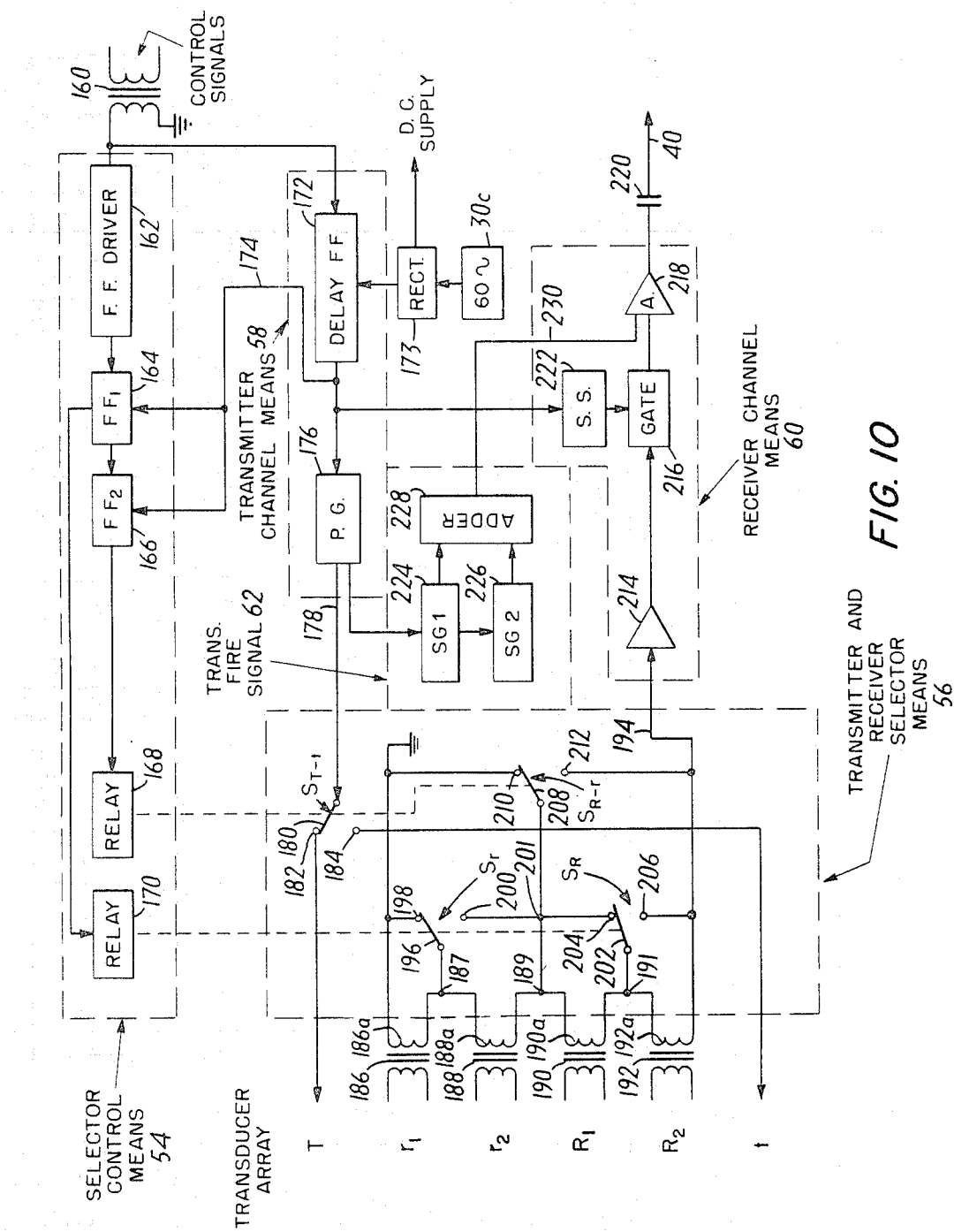
Figure 11:
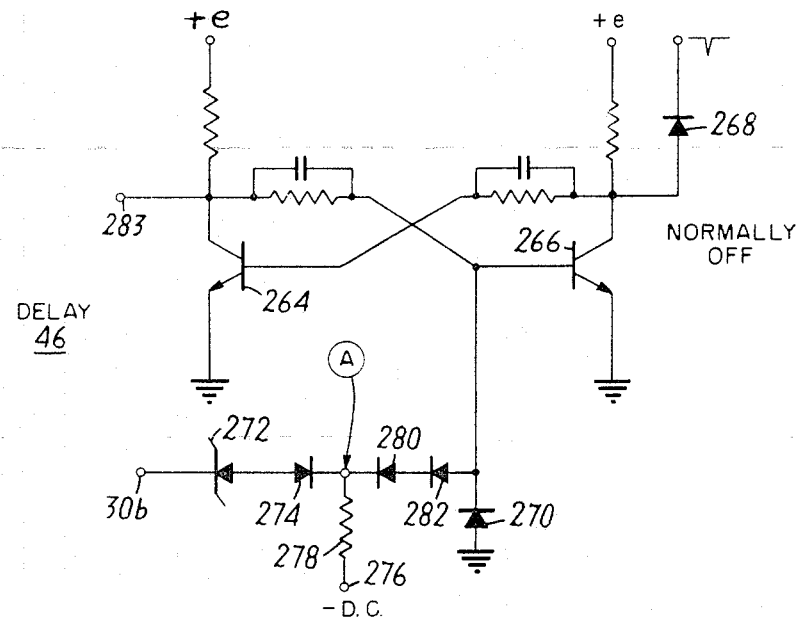
Figure 12:
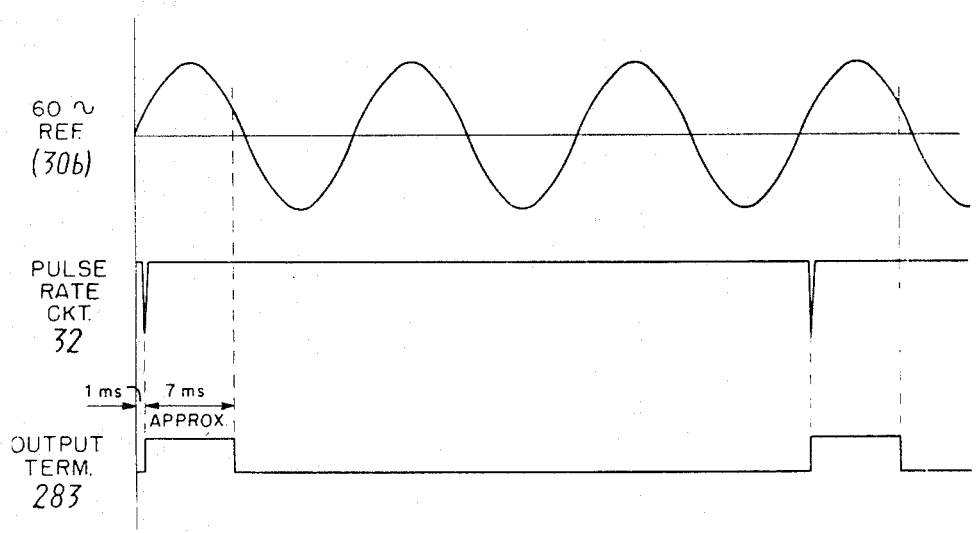
Figure 15:
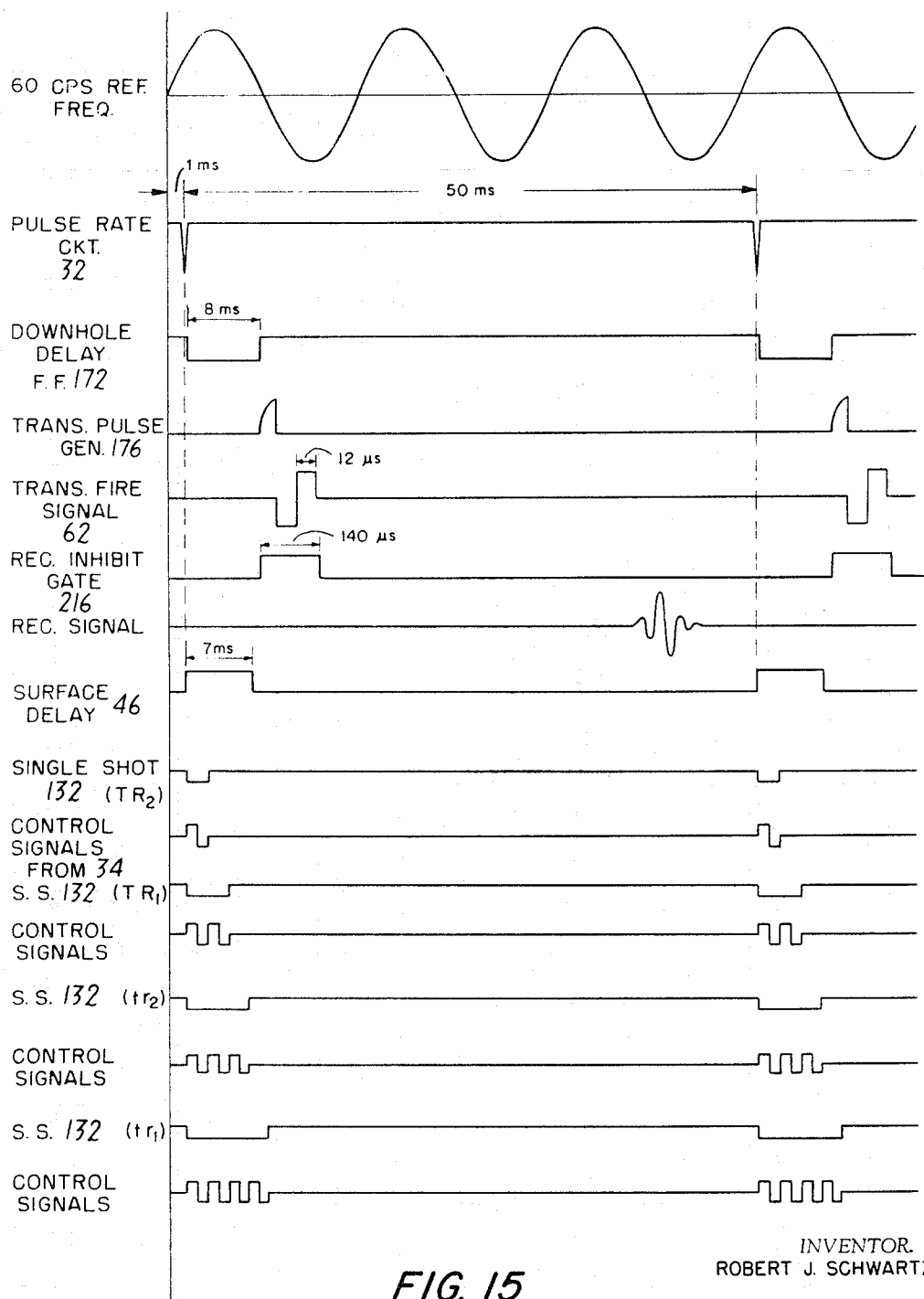

FIGURES 7, 8, and 9 are waveform diagrams useful in explaining the operation of the surface electronic equipment illustrated in FIGURES 5 and 6;

FIGURE 10 is a detailed diagram of the downhole electronic apparatus illustrated broadly in FIGURE 2;

FIGURE 11 is a circuit diagram of a synchronized delay circuit used in the surface equipment of FIGURE 5;

FIGURE 12 is a series of waveforms useful in explaining the operation of the circuit of FIGURE 11;

FIGURE 13 is a circuit diagram of a synchronized delay circuit used in the downhole equipment of FIGURE 10;

FIGURE 14 is a series of waveforms explaining the operation of the circuit of FIGURE 13; and FIGURE 15 is a timing diagram helpful in explaining the overall operation of the system.

GENERAL DESCRIPTION

Figure 1:
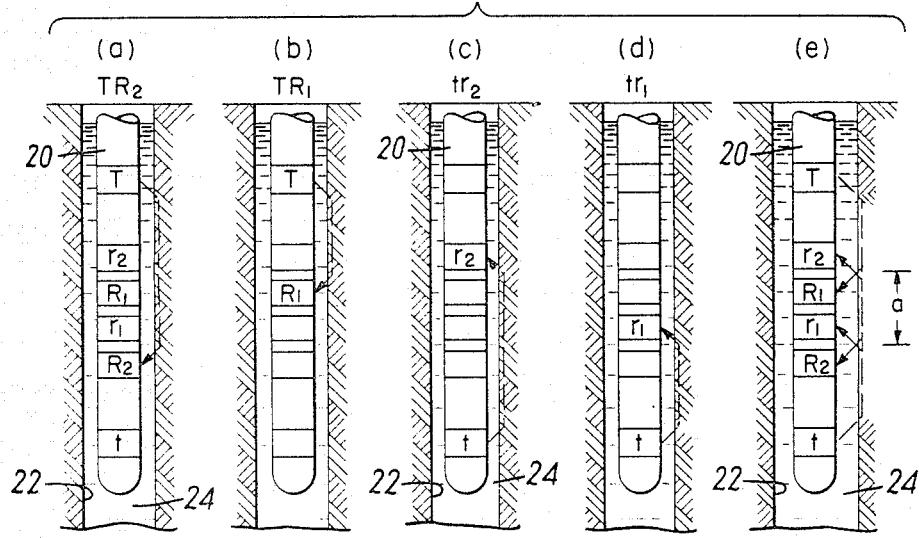
FIGURE 1 is a series of diagrammatic representations of a well logging tool according to the invention useful in understanding the novel logging technique involved.

The basic techniques of the invention are illustrated by the five diagrams $a$ to $e$ of FIGURE 1. Each of these diagrams shows a well logging tool 20 disposed in a borehole 22 through the earth formations under investigation. In conventional manner, the borehole may be filled with the drilling fluid 24.

The logging tool, only the lower portion of which is shown in the diagrams of FIGURE 1, includes a pair of longitudinally spaced acoustic transmitters, T, $t$, and four acoustic energy receivers, $r_2$, $R_1$, $r_1$, $R_2$, disposed in the order named between the two transmitters. As will be explained in greater detail hereinafter, by appropriate circuitry, receivers $R_1$ and $R_2$ are arranged to be responsive only to acoustic impulses originating with the transmitter T, while receivers $r_1$ and $r_2$ are responsive only to acoustic impulses from transmitter $t$.

In accordance with the invention, one or more of a plurality of travel time measurements between transmitters and receivers in the logging tool are taken during a complete measurement cycle. With the transmitter-receiver array shown, four separate travel times may be measured. As seen in diagram $a$, the dotted line represents the acoustic energy path from transmitter T to receiver $R_2$ and the travel time measurement is obtained by utilizing only these two acoustic elements in a given time period. Similarly, the travel time between transmitter T and receiver $R_1$ may be measured as seen in diagram $b$; the travel time between transmitter $t$ and receiver $r_2$ as in diagram $c$ and the travel time between transmitter $t$ and receiver $r_1$ as seen in diagram $d$.

A typical measurement cycle is shown in diagram $e$ of FIGURE 1. There it is desired to obtain a travel time measurement through a small distance "$a$" through the formations. This could be obtained, for example, by the following sequence of measurements:

(1) During a first portion of the measurement cycle, actuating transmitter T and receiver $R_2$ only to obtain the travel time $TR_2$ (diagram $a$)

(2) During a second portion of the measurement cycle, actuating transmitter T and receiver $R_1$ only to obtain the travel time measurement $TR_1$ (diagram $b$)

(3) During a third portion of the measurement cycle, actuating transmitter $t$ and receiver $r_2$ only to obtain the travel time $tr_2$ (diagram $c$)

(4) During the fourth and final portion of the measurement cycle, actuating transmitter $t$ and receiver $r_1$ only to obtain the travel time $tr_1$ (diagram $d$).

Having made these four individual travel time measurements, the average travel time, $\Delta t$, of acoustic energy through a distance "$a$" in the formations may be obtained by combining the individual measurements in accordance with the following relationship:

$$TR_2 - TR_1 + tr_2 - tr_1/2 \qquad (1)$$

In a typical arrangement, the spacing between transmitter T and receiver $R_1$, and transmitter $t$ and receiver $r_1$ along the support is three feet in each case, and the spacing between receivers $R_1$ and $R_2$ and receivers $r_1$ and $r_2$ is 1 foot, making the distance "$a$" equal to 1 foot. Accordingly, the resultant calculation gives both travel time (in microseconds) and velocity (in microseconds per foot) at the same time. Other spacings, such as 2' or 3' could be used if desired and appropriate scales for such spacings can be easily made.

It will be apparent from consideration of the various acoustic paths followed in making the measurement over the distance "$a$" that the time of travel of acoustic energy through the well fluids will be cancelled out. In the ideal situation of a perfectly cylindrical well bore and an exactly aligned logging tool, this factor would be eliminated entirely, but even under actual borehole conditions, the effect of the well fluid on the measurement is substantially reduced. The multiple measurements also substantially reduce any error due to refraction of acoustic impulses at the various interfaces, thereby further increasing the accuracy of the measurement. The upper and lower transmitters also serve to minimize inaccuracies in the measurement resulting from inclination of the well sonde relative to the axis of the well bore and irregularities or cavities in the borehole wall.

As will be appreciated, the individual acoustic paths for each of the separate measurements taken during a cycle are relatively long, thus permitting effective handling of the separate electrical signals and accurate measurement of the travel time. However, the difficulties in log interpretation usually resulting from measurements between widely spaced points are eliminated by combining the several measurements in the manner described. Thus, the invention makes use of the advantages of prior art systems while at the same time avoiding their shortcomings.

In addition to the four-section measurement cycle described above, the receivers and transmitters of the invention may be selectively actuated to provide, within a given measurement cycle, simply any one of the four individual measurements shown in diagrams $a$ through $d$ of FIGURE 1. Furthermore, within a two-section measurement cycle, the travel times between transmitter T and receivers $R_2$ and $R_1$ respectively may be obtained, and which when subtracted, will give the travel time between receivers $R_1$ and $R_2$. Similarly, the travel time between receivers $r_1$ and $r_2$ may be obtained within a two-section cycle. It will be seen then, that the apparatus of the present invention is capable of providing any one of seven separate travel time measurements within a given measurement cycle.

Referring now to FIGURE 2, the overall organization of the logging system of the invention is shown in block form. The elongated logging tool 20 is provided with usual centralizers 21, which may be made of rubber for example, adjacent its upper and lower ends for maintaining the tool centered as effectively as possible in the borehole 22, which is filled with the usual drilling mud or fluid 24.

The tool 20 is suspended in the well bore by means of an armored cable 26 extending from the upper end of the tool to the surface of the earth. The cable is spooled on a winch 28 as is known in the art, operation of which serves to raise and lower the tool through the well bore. The cable 26 may contain a plurality of conductors for providing paths for electrical signals between the surface equipment and the downhole apparatus, as well as to supply electrical power from a source on the earth surface to the downhole equipment.

The tool 20 itself is divided generally into two portions. The upper portion 20a houses the electronic equipment carried by the tool, while the lower portion 20b serves as a support for the acoustic transmitters and receivers. Although not illustrated in the drawing, it will be understood that the portion 20b of the housing will be so constructed that direct transmission of acoustic energy therethrough from the transmitters to the receivers is either suppressed to a negligible level or delayed with respect to the travel times through the formations as to not interfere with the measurements. Various types of housing construction, such as of open work design, are known in the art for this purpose.

The surface equipment of the system is shown generally in block form above the dotted line in FIGURE 2. The master reference frequency for overall operation of the logging system is provided by an approximately 60 c.p.s. power source, which may be obtained from commercial power lines where available or from separate generators. Preferably, power is conducted form its source at the surface to both the surface equipment and, via suitable conductors in the cable 26, to the downhole equipment, but for ease of illustration, three separate 60 c.p.s. inputs, 30a, 30b, and 30c, are shown in FIGURE 2. As will be seen from the ensuing description, the 60 c.p.s. source provides operating power for the electronic equipment as well as providing a reference frequency.

Master timing pulses for synchronizing the various components of the system are generated by the pulse rate circuit 32. This circuit provides a train of sharp pulses whose frequency is an integral submultiple of the 60 c.p.s. reference frequency. Thus, for example, the repetition frequency of the timing pulses generated by the circuit 32 may vary from ⅛ to ½ of the 60 c.p.s. reference frequency. Of course other frequencies or ratios could be used if desired. Between each pair of successive pulses generated by the rate circuit 32, an individual transmitter-to-receiver travel time measurement is made and the pulse frequency selected will therefore depend upon the particular type of formations expected to be encountered. A timing pulse rate that has been found suitable for a wide variety of applications is twenty pulses per second, which provides a pulse period, or spacing between successive timing pulses, of fifty milliseconds.

The timing pulses generated in the pulse rate circuit 32 are transmitted via conductor 33 directly to a control signal generator 34. The timing pulses also serve to synchronize operation of a selector programmer 36, whose output is delivered to the control signal generator 34. The selector programmer 36 is provided with means, such as a manually actuated switch arm, which enables any one of the seven available measuring sequences to be selected.

Between each successive pair of timing pulses from the pulse rate circuit 32, the control signal generator provides a control signal, consisting of one to four distinct control signal pulses, over conductor 38 to the downhole equipment.

Electrical signals indicative of the acoustic measurements made in the downhole equipment are transmitted to the surface over conductor 40 in the cable 26. These signals are supplied to a detecting circuit 42 which produces an output correlated with the travel time measurements and which is suitable as an input to the computer 44. The detecting circuit 42 is rendered responsive to electrical signals transmitted from the downhole equipment by timing pulses from the pulse rate circuit 32 transmitted via fixed delay means 46. The delay means is synchronized with the 60 c.p.s. reference frequency 30b and insures that the detecting circuit is not rendered operative until just prior to the expected arrival of a signal from the downhole equipment, to minimize the possibility of errors resulting from spurious signals.

The particular arithmetic function to be performed by the computer depends upon the particular measurement sequence chosen by the selector programmer 36. Instructions are fed to the computer via conductor 48 directly from the programmer 36, and also from the output of AND circuit 50 which is responsive to the simultaneous application of signals from the delay means 46 and the programmer 36. The instruction signals supplied to the computer 44 dictate the particular arithmetic function which it is to perform and also tells it when a particular computation has been completed and to prepare for the next computation.

The output provided by the computer 44 is in the form of an electrical signal whose amplitude is directly proportional to the particular travel time measurement taken during the measurement cycle. The signal is fed to an indicating means, such as a recording galvanometer, to produce a visually interpretable indication. As indicated by the dotted line, the record feeding means for the recording device is mechanically linked to the winch 28 for movement therewith, whereby a plot of travel time vs. depth in the well is obtained.

The control signal pulses from the control signal generator 34 are conducted via conductor 38 in the cable 26 to operate the downhole equipment shown below the dashed line in FIGURE 2, and which is housed within the upper portion 20a of the logging tool 20. This equipment includes a selector control means 54 which interprets the received control signal pulses to select the specific transmitter-receiver combination to be activated during each measurement. The actual selection is accomplished by a transmitter and receiver selector means 56 which responds to the selector control means to put in circuit the particular transmitter-receiver pair desired.

The control signal pulses from the control signal generator 34 at the surface of the earth are also supplied to a transmitter channel means 58 in the downhole equipment. The transmitter channel means 58 is synchronized with the 60 c.p.s. master reference frequency, 30c, and performs a three-fold function. Firstly, the transmitter channel means 58 provides an output current pulse to activate the transmitter selected by the selector means 56. This generates the acoustic energy whose travel time to the selected receiver is to be measured.

The transmitter channel means 58 also provides a blocking signal to deactivate a portion of the receiver channel means 60. Conveniently, the receiver channel 60 comprises a multi-stage amplifier provided with gating means to prevent an input signal to the first stage from reaching its output stage. The output of the transmitter channel means 58 supplies a blocking signal to the receiver channel means 60 which commences just prior to the generation of the transmitter output pulse and continues to a time just prior to the earliest possible arrival of a signal from the selected receiver. Thus, spurious signals or cross talk cannot be transmitted by the receiver channel means 60 to the surface equipment during this period. The input stage of the receiver channel means 60 is coupled via the selector means 56 to the selected receiver.

The transmitter channel means 58 also actuates, at the time the transmitter is pulsed, a transmitter fire signal circuit which generates a narrow pulse indicating the time of firing of a transmitter. The fire signal pulse is coupled to the unblocked output stage of the receiver channel means 60 and is transmitted immediately to the surface via conductor 40.

After the input stage of the receiver channel means 60 is unblocked, electrical signals resulting from the acoustic impulses detected by the selected receiver will be amplified and transmitted to the surface of the earth via cable conductor 40. For each measurement then, there will be supplied to the surface equipment (1) a marking pulse indicative of the time of firing of the transmitter and (2) an electrical signal corresponding to the impulse at the associated receiver. It will be understood of course, that the selected receiver in the logging tool converts the incident acoustic energy into electrical signals having waveforms representative of such acoustic energy in conventional manner.

To illustrate the operation of the overall system, assume that it is desired to make a log of the travel time along the distance "$a$," as shown in FIGURE 1, diagram $e$. As discussed hereinabove, such a measurement necessitates the taking of four individual travel time measurements: $TR_2$, $TR_1$, $tr_2$, and $tr_1$. The selector programmer 36 is set by the operator to perform the desired measurement, the logging tool 20 positioned in the well bore, and power supplied to actuate the winch and to provide energy to the electronic circuitry.

Upon receipt of the first timing pulse from the pulse rate circuit 32, the control signal generator 34 generates a control signal representative of the $TR_2$ measurement and transmits it to the downhole apparatus. The control signal is received at the selector control means 54 which actuates the transmitter and receiver selector means 56 so that only the transmitter T and receiver $R_2$ in the tool are operative. At the same time, the transmitter channel means 58 is rendered operative to pulse the transmitter and actuate the receiver channel means 60 in accordance with the previous description. Signals representative of the transmitter firing time and the received impulse are transmitted to the surface, and through the detecting circuit 42 to the computer 44. All of this occurs prior to the generation of the second timing pulse by the pulse rate circuit 32. The computer 44, having been instructed by the selector programmer that the complete measurement cycle requires four individual travel time measurements, holds the information representative of this first measurement.

The operation is repeated upon receipt by the control signal generator 34 of the second pulse from the pulse rate circuit 32, with the difference that the control signal generated is such as to set up the selector control means 54 and the transmitter receiver selector means 56 to render the transmitter T and receiver $R_1$ operative. The resultant travel time indication is conducted to the surface computer. Similarly, the third and fourth timing pulses from the pulse rate circuit 32 set up the transmitters and receivers in the logging tool to provide the travel time measurements $tr_2$ and $tr_1$ during the third and fourth timing periods, respectively.

Upon receipt of the fourth travel time measurement from the downhole equipment, the computer 44 performs the arithmetic function indicated by the relationship (1) above, to provide an output signal to the recording galvanometer 52 indicative of the acoustic travel time over the distance "$a$."

At the conclusion of the fourth individual travel time measurement and performance of the arithmetic function, the selector programmer, in conjunction with the AND circuit 50, resets the computer and readies it for another computation sequence. The programmer 36 now causes repetition of the entire cycle, the fifth output pulse from the pulse rate circuit 32 being effective to initiate a second measurement of the travel time $TR_2$. The logging tool has during this time moved to a different position along the borehole. It will be seen then, that as the tool moves through the borehole, successive measurements of the travel time over a distance "$a$" are made, each of the recorded values being obtained within a measurement cycle consisting of four pulse periods of the pulse rate circuit 32. Although ordinarily the logging tool is continually moving during the measurement cycle, the pulse rate and logging speed are such that the resultant measurement is effectively over a fixed distance "$a$" through the formations.

If for example, it were desired to make a log of the travel time over the distance between receivers $R_2$ and $R_1$ only, the switch arm on the selector programmer would be moved to the corresponding position, directing the apparatus to make the measurements $TR_2$ and $TR_1$, and the computer 44 to perform the function:

$$TR_2 - TR_1 \qquad (2)$$

It will be evident that such a measurement may be performed within a measurement cycle consisting of but two pulse periods of the pulse rate circuit 32. In similar fashion, the measurement $tr_2 - tr_1$ may be made within a two pulse period measurement cycle and the individual measurements $TR_2$, $TR_1$, $tr_2$, and $tr_1$ may be made within single pulse period measurement cycles.

The details of the individual components of the system, shown broadly in FIGURE 2, will now be described.

PULSE RATE CIRCUIT 32

The pulse rate circuit 32 which provides the master timing pulses to synchronize operation of the logging equipment is shown in schematic form in FIGURE 3. It consists generally of a pulse oscillator of the relaxation type 66 which includes a unijunction transistor 70 as its active element. Base B1 of the transistor is coupled via resistance 72 to a source of D.C. potential 74. Base B2 completes the circuit to ground through resistor 76. The timing circuit, consisting of variable resistor 78 and capacitor 80 connected in series between the D.C. source 74 and ground, has the common terminal 84 of the elements 78, 80, connected through a diode 82 to the emitter E of the transistor 70. In operation, capacitor 80 charges from the D.C. source 74 through the resistor 78 at a rate dependent upon the RC time constant of the latter two circuit elements. When the ptoential at point 84 gets sufficiently high, the transistor is forward biased and rendered highly conductive, discharging the capacitor 80 very rapidly and providing a narrow, high amplitude pulse at the output lead 86.

The 60 c.p.s. source, 30$a$, which may be existing commercial power mains if available, is supplied to a phase shifting network 88 which effectively delays the waveform for a period of one millisecond, and then supplies it to a squaring circuit or clipper 90 whose output is a square wave, FIGURE 4($b$). The square wave is differentiated in differentiating circuit 92 to provide the train of positive and negative-going sharp pulses, shown in FIGURE 4($c$), which are coupled to the emitter E of the transistor 70 through a coupling capacitor 94. The unidirectional conducting device 82 serves to eliminate the negative-going peaks and only the positive peaks are applied to the transistor.

As seen best in FIGURE 4($d$), the positive pulses from the differentiator 92 are superimposed upon the charging voltage built up across the capacitor 80. This voltage rises towards the firing or trigger level of the transistor 70 until a value is reached at which the sum of the charging voltage and the superimposed pulse causes the transistor to conduct to become conductive to generate the negative-going output pulses, FIGURE 4(e). The pulses derived from the sixty cycle reference frequency serve to synchronize the operation of the relaxation oscillator 66 and thereby insure continuous and accurate timing.

The pulse repetition rate, and conversely the space in between successive timing pulses, may be controlled by means of variable resistor 78. Adjustment of this element is effective to change the charging rate of the capacitor 80 so that different ones of the synchronizing pulses are effective to cause the transistor 70 to fire. In this manner, sub-multiples of the 60 cycle reference frequency, ranging from 6.66 pulses per second to as many as 30 pulses per second may be accurately obtained. In the waveforms of FIGURE 4, the timing pulse frequency obtained is 20 pulses per second, or ⅓ of the reference frequency.

SELECTOR PROGRAMMER 36

The uphole or surface equipment of FIGURE 2 is shown in greater detail in FIGURE 5. As illustrated therein, the selector programmer 36 comprises first and second flip-flop circuits 100, 102, whose outputs provide four different pairs of input signals to respective AND circuits, 104, 106, 108, and 110. The outputs of the four AND circuits are connected directly to the selector switch 120. Additionally, outputs of AND circuits 104 and 108 are supplied to an OR circuit 112 and outputs of AND circuits 106 and 110 to OR circuit 114. The two OR circuit outputs are similarly connected to the selector 120. AND circuit 110 also is directly coupled, via additional conductor 116, to the selector switch 120.

Operation of the selector programmer 36 may be best explained with reference to the waveforms of FIGURE 7. The master timing pulses from the pulse rate circuit 32 are first supplied to the flip-flop circuit 100 which provides a pair of complementary outputs on conductors 100a and 100b changing state each time the master timing pulse is applied thus cycling at ½ the frequency of the master timing pulses. The output signal on lead 100b is also supplied as an input to the second flip-flop circuit 102 whose output, in turn, provides a pair of complementary outputs on leads 102a and 102b having half the frequency of the output waveform from the flip-flop 100. AND circuit 104 combines the output signal appearing on conductors 100a and 102a, AND circuit 106 combines the outputs on 100a, and 102b, and AND circuit 110 combines the outputs on 100b and 102b. The outputs of AND circuits 104 and 108 provide the inputs to OR circuit 112 to produce the output signal shown, whose complement is generated by OR circuit 114 in response to inputs from AND circuits 106 and 110.

The switch means 120 is shown in detail in FIGURE 6 and is seen to include seven switch banks 120a through 120g, each of which includes seven fixed contacts and a movable contact. As indicated by the dashed line, all of the movable contacts are mechanically ganged for simultaneous movement, which preferably may be effected manually by the operator. The switch may be of the rotary type for example, or any other suitable form.

The movable contacts of switch banks 120a, 120f, and 120g are connected to output leads 122, 124 and 126, respectively. In the first three positions of the switch, the leads 122, 124 and 126 are connected respectively to the outputs of OR circuit 112, OR circuit 114, and AND circuit 110 (via conductor 116). In the remaining four positions of the switch, the three leads are respectively connected to a positive D.C. voltage, +e, a negative D.C. voltage, −e, and a positive D.C. voltage, +e. As will be explained more fully hereinafter, the outputs of switch banks 120a and 120f provide add-subtract steering instructions for the computer 44 while the output of switch bank 120g provides the computer reset signal.

Selector switch banks 120b to 120e are coupled respectively to AND circuits 104, 106, 108, and 110. The diodes 128 coupled to the movable contacts in each of these switch banks prevents signal feedback between the respective banks. The input connection from each of the AND circuits is split into seven individual paths, each going to a separate contact in the switch bank. These seven paths are arranged to provide varying resistances between the AND circuit providing the input to the bank and the respective movable contact, varying from a direct connection (zero resistance) through three discrete resistance values which preferably are integral multiples of a given resistance "r". For example, the three resistances may be respectively 1, 2, and 3 times the given value "r". To facilitate understanding of the operation of the switch, the lengths of the schematic representations of the resistors in FIGURE 6 correspond to the multiple selected. Thus, as will be seen from the drawing, the last three contacts of each of the four switch banks include respectively, 1, 2 and 3 times the given resistance value.

The various resistance combinations set up by the selector switch 120 in its different positions are best illustrated by means of the following table, in which the left-hand contact of each of the switch banks is position 1 and the basic resistance unit is designated as r:

TABLE I

| Selector Switch Position | Bank 120b | Bank 120c | Bank 120d | Bank 120e |
|---|---|---|---|---|
| 1 | 0 | r | 2r | 3r. |
| 2 | 0 | r | 0 | r. |
| 3 | 2r | 3r | 2r | 3r. |
| 4 | 0 | 0 | 0 | 0. |
| 5 | r | r | r | r. |
| 6 | 2r | 2r | 2r | 2r. |
| 7 | 3r | 3r | 3r | 3r. |

Depending upon the position of the movable contact then, each of the individual switch banks 120b through 120e will insert between its input and the common output lead 130, a resistance which may be 0, 1, 2, or 3 times the base value "r". The particular resistance value is utilized in the control signal generator 34 to produce the proper control signals.

CONTROL SIGNAL GENERATOR

As seen in FIGURES 5 and 6, the control signal generator comprises a single shot multivibrator 132 that is actuated by each timing pulse supplied to it from the pulse rate circuit 32 via conductor 33. Single shot multivibrator 132 generates a pulse output which is controlled by the position of the selector switch. Switch 120 is coupled by conductor 130 to single shot multivibrator 132 and couples the current through the AND gates and selected resistances to control the multivibrator 132. It will be noted that in switch positions 1, 2 and 3, different resistance values are inserted during successive time periods established by the AND gates, while in each of positions 4, 5, 6 and 7, the same resistance is inserted during successive time periods.

The output of a single shot multivibrator is in turn used to control the operation of an astable multivibrator 134 whose output is amplified in amplifier 136 and coupled by transformer 138 to the cable for transmission to the downhole equipment.

Turning now to FIGURES 6, 8 and 9, the single shot multivibrator 132 comprises a normally conductive transistor 136 and a normally off transistor 138, the collector of the transistor 136 being coupled through a parallel RC network 140 to the base of transistor 138. The collector of transistor 138 is in turn coupled through a capacitor 142 to the base of transistor 136. When a timing pulse from conductor 33 is applied to the base of transistor 136 via diode 144 and capacitor 142, it turns off that transistor and renders transistor 138 conductive. The voltage at point A, FIGURE 8(b), drops sharply. As transistor 138 conducts, it charges capacitor 142 through the resistor 146, conductor 130, and the selected resistance in the switch bank then being supplied with current from its associated AND circuit, at a rate dependent upon the total resistance in that current path. The resistor 146 is chosen to have a resistance value equal to the designated base value "r," discussed in connection with the selector switch 120.

As shown in FIGURE 8(c), the voltage at point B of the single shot multivibrator 132 will rise as the capacitor 142 charges until a point is reached at which the conductive conditions of the two transistors are restored to their initial conditions, i.e., transistor 136 on and transistor 138 off. At that time, the potential at point A will return to its normal value and the circuit will remain in that condition until the next timing pulse provided by the pulse rate circuit 32. The duration of negative-going voltage pulse at point A will therefore depend upon the product of the capacitance 142 and the resistance 146 plus the selected resistor in the switch bank then being supplied with current by an output from its associated AND circuit. Since resistor 146 is of the designated value "r," the total resistance in the timing circuit of the single shot multivibrator 132 for each position of the selector switch 120 will be in multiples of that value, as may be seen from the following table:

TABLE II

| Selector Switch Position | Total r Bank 120b | Total r Bank 120c | Total r Bank 120d | Total r Bank 102e |
| --- | --- | --- | --- | --- |
| 1 | r | 2r | 3r | 4r. |
| 2 | r | 2r | r | 2r. |
| 3 | 3r | 4r | 3r | 4r. |
| 4 | r | r | r | r. |
| 5 | 2r | 2r | 2r | 2r. |
| 6 | 3r | 3r | 3r | 3r. |
| 7 | 4r | 4r | 4r | 4r. |

The negative-going pulse available at point A of the single shot multivibrator, the length of which will depend upon the total charging resistance, is supplied as the input to the astable multivibrator 134. This circuit is generally conventional in form and consists basically of a pair of transistors 148, 150, cross coupled in the usual manner. The negative-going pulse from the single shot multivibrator is coupled via a zener diode 152, which acts as a voltage control device, to the base of a normally conductive transistor 154 to turn it off. The resultant reduction of current through 154 applied to the base circuit of transistor 148 permits the timing resistor, R, to charge its associate timing capacitor C which after an appropriate timing period cycles the astable multivibrator which produces a pair of complementary square wave output pulse trains at points D and E respectively, see FIGURES 8(e) and 8(f). These output signals are coupled through amplifier 136 and transformer 138 to the cable for transmission to the downhole equipment. The transformer 138 serves to shift the zero axis of the resultant pulse signal, as shown in FIGURE 8(g).

The pulse repetition frequency provided by the astable multivibrator remains fixed in accordance with the values of the associated resistances and capacitances. The duration of the negative-going pulse provided by the single shot multivibrator thus determines the number of pulses produced by the astable multivibrator during its period of activation. The parameters of the astable multivibrator 134 are so selected with respect to the designated resistance value "r" such that, as illustrated in FIGURE 9, a total resistance of "r" produces a single output pulse cycle, a total resistance 2"r" produces two pulse cycles, a total resistance 3"r" produces a three pulse cycle output, and a total resistance of 4"r" produces four output pulse cycles.

The output pulse groups, each of which may consist of from 1 to 4 pulse cycles, are transmitted via the cable to the downhole equipment. As will be explained in detail hereinafter, the particular transmitter and receiver combination to be selected will depend upon the number of pulses in the particular group. Thus, in the example selected for illustrative purposes, a single pulse will be sent from the control signal generator during the first portion of the measurement cycle, setting up a $TR_2$ measurement. During the next portion, initiated by the second timing pulse from the pulse rate circuit 32, two control pulses will be transmitted, directing a $TR_1$ measurement. Similarly, three control pulses will establish a $tr_2$ measurement while four control pulses will select a $tr_1$ measurement. In each case, the first pulse of the group, which has half the total voltage swing of the succeeding pulses, is used merely for reset, or conditioning purposes, thus, in effect providing 0, 1, 2 and 3 advance pulses to the selector control means.

SELECTOR CONTROL MEANS 54

The downhole equipment carried by the logging tool 20 is illustrated in detail in FIGURE 10. The control signal groups illustrated in FIGURE 9 are supplied via transformer 160 to the input of the selector control means 54. The latter comprises a flip-flop driver circuit 162 which actuates a first flip-flop divider circuit 164. The driver circuit 162 is responsive to each positive-going pulse of the control signal, to change the state of the flip-flop 164. A second flip-flop, 166, is actuated by one output of flip-flop 164 whereby its state is changed ½ the number of times as flip-flop 164. The outer output of flip-flop 164 is coupled to energize the coil of a relay 170 whose armatures are in the receiver-selector portion of the transmitter and receiver selector means 56. Similarly, an output of flip-flop 166 energizes the coil of relay 168 whose armatures are in the selector means 56 and which, in conjunction with the armatures of relays 170, select the transmitter and receiver to be actuated during the particular portion of the measurement cycle.

The first negative-going portion of a pulse control group is used to provide a reset signal effectively resetting flip-flops 164, 166 to an "0" or initial state and the first positive pulse is ineffective for controlling the desired state of the flip-flops 164, 166. Thus, for example, if the control signal for the particular measurement consists of a single pulse cycle, the flip-flops 164, 166 remain in their "0" or initial states, which sets up a particular relationship of the energization of relays 168 and 170. A two pulse control signal will establish a different relationship, as will three and four pulse control signals. It will be apparent that the two relay coils 168 and 170 allow for four different combinations of energized and unenergized conditions. If desired, two pairs of single pole relays may be used, instead of the two double pole relays shown.

TRANSMITTER CHANNEL MEANS 58

The control signal is also coupled to the input of a delay flip-flop circuit 172 in the transmitter channel means 58. This circuit is responsive to the first negative-going swing of the control signal (i.e. the trailing edge of the reset pulse) to initiate a delay pulse of a given duration. The timing of the delay circuit 172 is synchronized with the master timing cycle from the 60 c.p.s. reference source 30c. This insures that the delay provided by the circuit is not only accurate with respect to the control signal provided to its input, but also that it is in step with the master timing plan of the overall system. The delay provided by the circuit 172, for example, is approximately 8 milliseconds. The time relationship will be readily apparent from consideration of the waveforms of FIGURE 15, which although not to scale, illustrate the proper timing sequence.

Conveniently, D.C. power for operation of the downhole apparatus may be obtained by rectification of the 60 c.p.s. available at 30c and the synchronizing signal supplied to the delay circuit 172 may be the unfiltered, full wave rectified voltage provided in a conventional D.C. supply 173.

The leading edge of the delay pulse provided by the circuit 172 is transmitted via conductor 174 as a reset signal to the flip-flop circuits 164, 166 in the selector control means, to restore these flip-flops to their initial conditions prior to receipt by driver 162 of the subsequent control pulses. The relays 168, 170, are thus reset to their original conditions at the beginning of each measurement cycle.

The trailing edge of the delay pulse from circuit 172 is effective to trigger a pulse generator 176 in the transmitter channel means to provide a sharp, high power pulse for actuating the acoustic transmitter in the logging tool. The delay afforded by the circuit 172 provides an interval at the beginning of a particular measurement which permits the selector control means to set up the particular transmitter-receiver combination dictated by the control signal received from the surface.

TRANSMITTER AND RECEIVER SELECTOR MEANS

As shown best in FIGURE 10, the transducer array consisting of transmitters T, $t$, and receivers $R_1$, $R_2$, $r_1$, $r_2$, are connected to the transmitter and receiver selector means 56. The transducers, not shown, may be of any well known type such as magnetostrictive, capable, in the case of the transmitters, of converting electrical pulses into acoustic pulses and, in the case of receivers, converting incident acoustic energy into electrical signals. For purposes of convenience and to simplify illustration of the circuit connections of the selector means 56, the four receivers are shown in FIGURE 10 in different order from that in which they actually appear in the logging tool, as indicated in FIGURE 2.

The actuating pulse output of the pulse generator 176 is connected via conductor 178 and the transmitter switch $S_{T-t}$ to one of the two transmitters T, $t$. The transmitter switch comprises an armature 180 movable between a pair of contacts 182 and 184 by the coil of relay 168 in the selector control means 54. In the position shown in the drawing, relay 168 is not energized and the armature 180 completes the circuit through the contact 182 to the transmitter T. The other transmitter, $t$, is not connected. The switch $S_{T-t}$ then selects the particular transmitter to be actuated in response to the condition of the relay 168.

The four acoustic receivers $r_1$, $r_2$, $R_1$, and $R_2$ are coupled via transformers 186, 188, 190, and 192, respectively, to the selector means 56. The secondary windings of the transformers are connected in series, and in conjunction with the relay switches to be described hereinafter, substantially eliminate undesirable cross-talk which would otherwise interfere with accuracy of the measurements.

A switch $S_r$ has an armature 196 movable between contacts 198 and 200 by means of relay 170 and connected to common terminal 187 of secondary windings 186a and 188a of transformers 186 and 188 respectively. The contact 198 is connected to the other terminal of secondary winding 186a and directly to ground, while the contact 200 is connected via junction 201 to the common terminal 189 of the secondary windings 188a and 190a of transformers 188 and 190 respectively.

A second switch $S_R$ also has an armature 202 actuated by the relay 170 to switch between contacts 204 and 206. The armature 202 is connected directly to the common terminal 191 of the secondary windings 190a and 192a of transformers 190 and 192 respectively. Upper contact 204 is connected to the junction 201 and common terminal 189 of the secondary windings of transformers 188 and 190 respectively, and contact 206 is connected directly to the other terminal on the secondary winding 192a of transformer 192 and the ouput conductor 194.

The final selection of the individual receiver is made by switch $S_{R-r}$ which includes an armature 208 actuated by the relay 168 to move between a pair of contacts 210 and 212. The armature 208 is connected directly to the junction 201. Contact 210 is grounded while contact 212 is directly connected to the output conductor 194. As seen from the drawing, the three relay switches $S_r$, $S_R$, and $S_{R-r}$ form a two level switching tree.

The switch $S_{R-r}$ serves to short out transformer secondaries 186a and 188a in one position and secondary windings 190a and 192a in its other postion. No signals from the shorted windings are coupled to the output conductor 194. The switches $S_r$ and $S_R$ serve to short out one of the two secondary windings initially selected by switch $S_{R-r}$. Thus in the positions illustrated in FIG. 10, secondary windings 186a and 188a (corresponding to receivers $r_2$ and $R_1$ respectively) are shorted out via switch $S_{R-r}$, while secondary winding 190a (corresponding to receiver $r_1$) is shorted by switch $S_R$. Winding 192a is the only unshorted and operative winding and thus only signals received by receiver $R_2$ appear on the output conductor 194. Since switch $S_{T-t}$ is in position to render transmitter T operative, it will be recognized that the selector means is shown in position for the $TR_2$ measurement.

The selector control means 54 is so arranged with respect to the selector switches in the selector means 56 that the relays 168, 170 set up a predetermined transmitter and receiver pair in response to a given number of pulses in the control signals. Thus, a single pulse control signal will set up the switch pattern (shown in the drawing) to select the $TR_2$ combination. For convenience, the four possible combinations that may be selected are shown in the following table:

TABLE III

| No. of Pulses in Control Signal | Trans.-Rec. Pair |
|---|---|
| 1 | $TR_2$ |
| 2 | $TR_1$ |
| 3 | $tr_2$ |
| 4 | $tr_1$ |

It will be understood that the selection of the transmitter and receiver pair by the control signals is effected completely during the delay afforded by the delay circuit 172 in the transmitter channel means. Thus, by the time the pulse generator 176 is actuated, the switches in the selector means 56 are in position to render the desired transmitter and receiver pair operative and they remain in that position until the arrival of the reset pulse in the next received control pulse group.

RECEIVER CHANNEL MEANS

The electrical signal corresponding to an acoustic impulse received by the selected receiver is coupled via conductor 194 to the input amplification stage 214 in the receiver channel means 60. The amplified signal is transmitted through an inhibit gate 216 and thence through a mixing amplifier stage 218 and blocking capacitor 220 to the cable conductor 40 for transmission to the surface.

The inhibit gate 216 is controlled by a single shot multivibrator 222 which is in turn responsive to the output of the delay flip-flop 172 in the transmitter channel means 58. At the same time that the output of the delay circuit 172 is generated to actuate the transmitter pulse generator 176, the single shot circuit 222 is rendered operative to close the inhibit gate 216 and thus block the receiver channel. The single shot circuit provides an inhibiting pulse output having a duration selected to insure that the gate remains closed from slightly before actuation of the transmitter until a time just prior to the earliest possible arrival of an acoustic impulse at a receiver, to avoid transmission of spurious impulses to the surface equipment (see FIGURE 15).

TRANSMITTER FIRE SIGNAL

Actuation of the pulse generator 176 (FIGURE 10) to pulse the selected transmitter also supplies an actuating signal to a first signal generator 224. The latter produces a negative-going pulse and also triggers a second signal generator 226 to produce a positive pulse immediately following the negative pulse. The negative and positive pulses are combined in an adder circuit 228 to provide an output having negative and positive-going portions of equal amplitude and duration, indicative of the time of firing of the acoustic transmitter. This marking pulse is transmitted via conductor 230 to the input amplifier 218 in the receiver channel means and then via capacitor 220 and cable 40 to the surface equipment. It will be noted that the amplifier 218 is not affected by the inhibit gate 216 and the marking pulse will be sent to the surface even though the receiver channel means 60 is insensitive to receiver acoustic signals. The transmitter marking pulse signals the commencement of the travel time to be measured during the particular timing interval and also serves to provide at the surface, an amplitude reference by means of which attenuation of the received signal during its transmission to the surface may be accounted for. The equal energy, opposite polarity portions of the pulse insure that no net charge is induced in the cable to interfere with the accuracy of the measurements.

DETECTING CIRCUIT

The transmitter marking signal from the fire signal generator 62 in the borehole equipment and electrical signals representative of received acoustic impulses are transmitted via cable conductor 40 to the detecting circuit 42 (FIGURE 2) in the surface equipment. The detecting circuit is shown in greater detail in FIGURE 5 and is seen to comprise an amplifier 232 whose output is supplied to a pair of detecting gates 234 and 236. Signals transmitted through the respective gates 234 and 236 actuate pulse generators 238 and 240 respectively. The output pulses from the pulse generators are supplied to the set and reset inputs of a flip-flop circuit 242.

The timing pulse from the pulse rate circuit 32 is transmitted over conductor 33 and through delay means 46 to open the detector gate 234. The delay means 46 is synchronized with the sixty cycle reference frequency 30b and provides a delay of approximately 7 milliseconds (slightly less than the delay provided by the delay circuit 172 in the transmitter channel means) so that the gate 234 is open just prior to the time of arrival of a transmitter marking pulse from the downhole equipment. The other gate 236 meanwhile is in a closed or blocking condition. The transmitter marking pulse passes through the now open detector gate 234 to actuate the pulse generator 238 which produces an output pulse signal representative of the time of arrival of the transmitter marking pulse at the surface.

The output pulse from the pulse generator 238 serves a three-fold function. It activates delay circuit 241, which after a short delay opens the detector gate 236, and at the same time closes the detector gate 234. Finally it provides a set pulse to the flip-flop 242 to produce a change at its output to open gate 246.

Upon arrival at the surface, the receiver signal passes through now open gate 236 to actuate the pulse generator 240. The pulse then generated is indicative of the time of arrival at the surface of the receiver pulse and is applied to the flip-flop 242 to reset it to its initial condition. It also serves to close the gate circuit 236.

The output of the flip-flop circuit 242 is in the form of a pulse which begins at the time of arrival at the surface of the transmitter marking signal element and terminates at the time of arrival of the receiver signal element. Since the signal delays afforded by the cable and intervening electronic apparatus will be the same for both signal elements, it will be seen that the duration of the output pulse of the flip-flop 242 is equal to the travel time of an acoustic signal in the formation surrounding the well bore between the selected transmitter and receiver. This pulse controls input information to the digital computer 44.

DIGITAL COMPUTER

The output from the flip-flop 242 in the detecting circuit is effective to open a normally closed gate circuit 246 in the computer 44 (FIGURE 5). During the period that the gate is open, pulses from a crystal controlled pulse oscillator 248 of a frequency appropriate for the desired timing resolution are transmitted therethrough to a counter 250. The latter may be in the form of a conventional counting ring adapted for bi-directional operation so that it may effectively add or subtract pulses supplied to it from a previously entered total. The function of the counter is controlled by an add-subtract steering control 252.

In reviewing the overall operation of the logging system described hereinabove, it will be noted that for every possible sequence of individual travel time measurements, the measurements $TR_2$ and $tr_2$ are always added in the computation, while the $TR_1$ and $tr_1$ measurements are subtracted in positions 1, 2, and 3 of selector switch 120. In positions 4, 5, 6, and 7, all measurements are added and transfer and reset occur each cycle. Returning now to the operation of the selector programmer 36 and the selector switch 120, it will be seen that the output provided by the OR circuit 112 results from operation of either of AND circuits 104 and 108, the first of which represents the measurement $TR_2$ and the other of which represents the measurement $tr_2$. Accordingly, the output of OR circuit 112 is coupled via conductor 122 to the "Add" direct input of the steering circuit 252. Similarly, the OR circuit 114, coupled to receive the outputs of AND circuits 106 and 110, provides outputs only when the measurements $TR_1$ and $tr_1$ are to be made, indicating the subtract function. The output of OR circuit 114 is coupled via conductor 124 to the "Subtract" control of the steering circuit 252.

In the case of the four measurement sequence being used as an example, the counter 250 will receive pulses indicative of the four individual travel time measurements being made with the appropriate add-subtract steering instructions supplied from the steering control 52. Accordingly, at the conclusion of the fourth and final measurement of the cycle, the counter will be storing a count representative of the net number of pulses received from the crystal oscillator 248.

During the last measurement of the cycle, the output from AND circuit 110 is coupled over conductor 116, through switch bank 120g in the selector switch 120, and over conductor 126 to the AND circuit 50. As will be seen from the waveforms in FIGURE 7, AND circuit 110 will provide an output for the entire period between every fourth and fifth timing pulses from the pulse rate circuit 32.

The timing pulses from the pulse rate circuit 32 are also applied over conductor 33 to the AND circuit 50 via the delay means 46 which provides a delay of approximately 7 milliseconds. Thus, only during the fourth portion of the measurement cycle will simultaneous inputs be provided to the AND circuit 50 to provide an output therefrom.

The output from AND circuit 50 is supplied through delay means 256 to render memory circuit 258 receptive to the information then being stored in the counter 250. The information in the counter 250 is divided by two as it is transferred to the memory circuit 258 and shortly thereafter, the counter is reset to zero by the reset means 260.

The net pulse count now stored in the memory 258 energizes a binary-to-analog converter 262 to provide an analog representation of the travel time. The resultant signal actuates the recording galvanometer 52 which provides the record of travel time ($\Delta t$) vs. depth in the well when the recorder is in motion.

From the foregoing, it will be seen that to make a log of acoustic travel time over the distance "$a$" of FIGURE 1($e$), four pulse periods of the pulse rate circuit 32 are required for each indication. It the measurement $R_2R_1$ or $r_2r_1$ is desired, only two pulse periods are required. As will be seen from consideration of the selector switch 120 in FIGURE 6, each of the two transmitter-receiver measurements will be repeated twice during a four section cycle before the computer is reset and the computer will then provide an output representing the average of the two separate measurements.

Where it is desired to measure the individual transmitter-receiver travel times, the selector switch 120 will be operated such that the movable contacts in banks 120$a$, $f$, and $g$ are shifted to positive, negative and positive values respectively of direct potential. The coupling of the positive potential through switch bank 120$g$ to AND circuit 50 conditions the memory circuit 258 to be receptive to information from the counter 250 during each pulse period and will similarly reset the counter 250 at the conclusion of each pulse period. Accordingly, when measuring the individual transmitter-to-receiver travel times, an indication will be recorded corresponding to each timing pulse from the pulse rate circuit 32. When making such measurements, the division by 2 performed in reading out the counter 250 is taken into account in interpreting the resultant log.

DELAY 46

FIGURE 11 illustrates a suitable circuit for the synchronized delay 46 in the surface equipment. As described above, the delay 46 opens the detector gate 234 (FIGURE 5) approximately 7 milliseconds after generation of a timing pulse by the pulse rate circuit 32.

The circuit comprises a pair of cross-coupled transistors 264, 266, with transistor 266 being normally in the nonconducting condition and transistor 264 being normally conducting. The collector of transistor 266 is connected via diode 268 to receive the master timing pulses from the pulse rate circuit 32. The diode 270 coupled to the base of transistor 266 maintains that transistor normally nonconductive by virtue of the small voltage drop across the diode. Receipt of a negative timing pulse from the pulse rate circuit 32 cuts off transistor 264 by lowering its base potential and, through the cross-coupling arrangement, renders transistor 266 conductive.

Sixty c.p.s. reference frequency is applied from source 30$b$ through a zener diode 272 and a conventional diode 274 to the junction A, to which point is also connected a source of negative D.C. potential 276 via resistor 278. Point A is also coupled to the base of transistor 266 through a pair of similar diodes 280, 282.

The zener diode 272 is effective to reduce the magnitude of the reference potential by a small increment while the diode 274 clips the negative half cycles of the waveform at a level determined by the magnitude of the negative D.C. source 276. The alternating waveform at point A is thus effective to provide a negative potential to the base of transistor 266 at a time slightly prior to the time at which the 60 c.p.s. reference wave goes negative. At this time, approximately 7 milliseconds after the arrival of the timing pulse, the transistor 266 is turned off and the circuit resumes its normal conditions. It will remain so until the arrival of the next timing pulse from the pulse rate circuit 32 at which time the circuit is again rendered operative to produce a positive-going output pulse at the output terminal 283. Operation of the circuit is thus synchronized with the pulses from the pulse rate source 32 and the reference frequency, as is evident from the waveforms of FIGURE 12.

DOWNHOLE DELAY CIRCUIT 172

The delay circuit 172 in the downhole equipment is illustrated in FIGURE 13. It comprises a pair of transistors 284, 286, of opposite conductivity types, both of which are biased to be normally conducting. The respective bases and collectors of the transistors are cross-coupled through parallel resistance-capacitance networks 288, 290. Control pulses from the surface are applied at terminal 292 to the base of transistor 284 through blocking diode 292$a$, along with the full wave rectified 60 c.p.s. reference from the power supply rectifier 173 which is applied to terminal 294 and through diode 294$a$. The delay pulse output is taken from terminal 296 at the collector of transistor 286.

Referring now to the waveforms of FIGURE 14, the first positive-going excursion of the control pulse does not affect the transistors because of the blocking diode 292$a$. However, the first negative-going voltage swing conducted through diode 292$a$ turns off transistor 284 and in turn transistor 286. Consequently, the output voltage at terminal 296 drops. Succeeding positive-going excursions of the control signal will have no effect because of diode 292$a$. At the conclusion of the first half-cycle of the reference signal, following the control signal, the potential applied to terminal 294 and diode 294$a$ raises the base of the transistor 284 to a value slightly above ground potential, which after a short delay, causes transistor 284 to become conductive, also turning on transistor 286 and raising the potential at the output terminal 296.

The output pulse provided at the terminal 296 is negative-going, and of a duration approximately equal to a half-cycle of the 60 c.p.s. reference frequency, i.e. 8 milliseconds.

From the foregoing, it will be seen that novel acoustic logging techniques and systems have been provided capable of performing a variety of measurements with great accuracy and speed. In accordance with one aspect of the invention, a travel time measurement over a relatively short distance through the surrounding earth formations is achieved by automatically combining the results of a plurality of individual measurements over greater lengths. Not only does this technique permit more informative logging, it also balances out the effects of refraction by the borehole fluid and variations in hole diameter, both of which heretofore resulted in inaccuracies in the log.

In another aspect, the invention provides novel transmitter and receiver organizations at the downhole location and novel surface equipment for the received acoustic signals, by means of which the aforementioned advantages may be achieved. It will be understood of course, that various modifications of the circuit details will occur to those skilled in the art, and it is intended that the invention be limited only by the scope of the appended claims.

I claim:
1. Apparatus for acoustic logging of earth formations surrounding a well bore comprising, an elongated logging tool adapted to be passed through the well bore, first and second acoustic transmitters mounted in said logging tool in longitudinally spaced apart relation and adapted to transmit acoustic energy through said formations, four acoustic receivers mounted in said logging tool between said acoustic transmitters and longitudinally spaced apart from said transmitters and each other, a master pulse source for generating periodic pulses having a spacing between successive pulses defining a measurement interval, signal generator means synchronized by said periodic pulses for selectively providing during a portion of each measurement interval control signals representative of one of a plurality of transmitter-receiver pairs, means responsive to said control signals for actuating the transmitter of said selected pair to generate a pulse of acoustic energy and for enabling an output to be obtained from the receiver of said pair during the remainder of each measurement interval, means for deriving during each measurement interval an electrical indication of the acoustic energy travel time between the transmitter and receiver of said pair, and means responsive to the electrical indications derived over a plurality of measurement intervals as said logging tool moves through the well bore for providing a record of acoustic travel time versus depth in the well.

2. Apparatus for acoustic logging of earth formations surrounding a well bore comprising a logging tool suspended and moved through said well bore by conductor cable means extending from the surface of the earth, said logging tool including a plurality of acoustic transmitters and a plurality of acoustic receivers, a reference frequency source at the earth's surface, a master pulse source synchronized by said reference frequency for generating periodic pulses having a spacing between successive pulses defining a measurement interval, signal generator means at the earth's surface for selectively providing within a relatively short time period at the beginning of each measurement interval control signals representative of one of a plurality of transmitter-receiver pairs, said cable means coupling said control signals to said logging tool, means in said logging tool responsive to each of said control signals to connect the transmitter-receiver pair represented thereby for operation during the remainder of the associated measurement interval, pulse generator means in said tool for activating the transmitter of said pair, receiving channel means in said tool for coupling the receiver of said pair to said cable, and means responsive to each of said control signals and synchronized by said reference frequency for actuating said pulse generator a fixed time after receipt of each of said control signals and blocking said receiver channel while said transmitter is activated, said fixed time being at least as long as said short time period.

3. Apparatus according to claim 2 above wherein said means for providing a signal indicative of the transmitter activation time comprises means for generating a signal having a portion of one polarity followed by an opposite polarity portion equal in amplitude and duration.

4. Apparatus for acoustic logging of earth formations surrounding a well bore in which a plurality of discrete measurements are taken, each within a respective one of a plurality of successive measurement intervals, comprising an elongated logging tool adapted to be moved through the well bore, said logging tool including at least two acoustic transmitters and four acoustic receivers mounted thereon in longitudinally spaced apart relation, means providing a control signal representative of one of a plurality of possible transmitter-receiver pairs within a relatively short time period at the beginning of each cycle, pulse generator means for activating the transmitter of the pair represented by each control signal, delay means responsive to each control signal for actuating said pulse generator a fixed time after receipt of said control signal, said fixed time being at least as long as said short time period, a receiving channel having an input for receiving electrical signals from the receiver of said pair and an output for transmitting signals to the earth's surface, means responsive to each control signal for connecting the transmitter and receiver of the pair represented thereby to said pulse generator and the input of said receiving channel respectively, within said short time period and maintaining such connections until the beginning of the succeeding measurement interval, and means responsive to the output of said delay means for blocking a portion of said receiving channel from a time just prior to activation of said transmitter to a time thereafter.

5. Apparatus for acoustic logging of earth formations surrounding a well bore comprising, an elongated logging tool adapted to be passed through the well bore, acoustic transmitter means mounted in said logging tool adapted to transmit acoustic energy through said formations, a plurality of acoustic receiver means mounted in said logging tool adapted to provide electric signals representative of acoustic energy intercepted thereby, electrical circuit means for receiving said electrical signals and transmitting signals indicative of a characteristic of the formations to the surface of the earth, a transformer for each of said receivers having its primary winding connected to receive the electrical signals provided thereby, means connecting the secondary windings of all of said transformers in series relationship, and selective means for enabling the output signals from only one of said transformer secondary windings at a time to be applied to said electrical circuit means.

6. Apparatus for acoustic logging of earth formations surrounding a well bore comprising, an elongated logging tool adapted to be passed through the well bore, acoustic transmitter means mounted in said logging tool adapted to transmit acoustic energy through said formations, first, second, third and fourth acoustic receivers mounted in said tool in longitudinally spaced apart relation and adapted to provide electrical signals representative of acoustic energy intercepted thereby, first, second, third and fourth transformers having primary windings connected to receive the electrical signals provided by said first, second, third and fourth receivers respectively, means connecting all of the secondary windings of said four transformers in series relationship, electrical circuit means for receiving said electrical signals and transmitting signals indicative of a characteristic of the formations to the surface of the earth, and selective means for enabling the output signals from only one of said transformer secondary windings at a time to be applied to said electrical circuit means.

7. Apparatus according to claim 6 wherein said selective means comprises first two-position switch means operative in one position to short said first transformer secondary winding and in the other position to short said second transformer secondary winding, second two-position switch means operative in one position to short said third transformer secondary winding and in the other position to short said fourth transformer secondary winding, said first and second switch means being actuated in unison between their respective first and second positions, and third two-position switch means operative in one position to short said first and second transformer secondary windings and in the other position to short said third and fourth transformer secondary windings.

8. Apparatus according to claim 7 wherein said acoustic transmitter means includes a pair of acoustic transmitters and wherein there is further provided fourth switch means for selecting one of said transmitters for actuation, said third and fourth switch means being actuated in unison.

9. Apparatus for acoustic logging of earth formations surrounding a well bore comprising, an elongated logging tool adapted to be passed through the well bore, first and second acoustic transmitters mounted in said logging tool in longitudinally spaced apart relation and adapted to transmit acoustic energy through said formations, four acoustic receivers mounted in said logging tool between said acoustic transmitters and longitudinally spaced apart from said transmitters and each other, a master pulse source for generating periodic pulses having a spacing between successive pulses defining a measurement interval, signal generator means synchronized by said periodic pulses for selectively providing during a portion of each measurement interval control signals representative of one of a plurality of transmitter-receiver pairs, programming means for controlling said signal generator means to provide individual control signals in predetermined order over a plurality of successive measurement intervals, means responsive to said control signals for actuating the transmitter of said selected pair to generate a pulse of acoustic energy and for enabling an output to be obtained from the receiver of said pair during the remainder of each measurement interval, means for deriving during each measurement interval an electrical indication of the acoustic energy travel time between the transmitter and receiver of said pair, and means responsive to the electrical indications derived over a plurality of measurement intervals as said logging tool moves through the well bore, to provide a record of acoustic travel time versus depth in the well.

10. In apparatus for acoustic logging of earth formations surrounding a well bore including a logging tool having a plurality of acoustic transmitters and receivers and suspended in said well bore by conductive cable means extending from the surface of the earth, surface equipment comprising, a master pulse source for generating periodic pulses having a spacing between successive pulses defining a measurement interval, signal generator means for selectively generating during an initial portion of each measurement interval a control signal representative of one of a plurality of possible pairs of transmitters and receivers in said tool, detecting means rendered operative during each measurement interval after generation of said control signal to receive electrical signals from said tool, and means responsive to the output of said detector means for recording signals representative of a characteristic of said formations as a function of depth in the well bore.

11. Apparatus according to claim 10 wherein said detecting means includes a first pulse generator for producing an output pulse upon receipt of a signal from the logging tool representative of the generation of a pulse by an acoustic transmitter, a second pulse generator for producing an output pulse upon receipt of a signal from the logging tool representative of acoustic energy received by an acoustic receiver, and normally closed gate means coupled to said second pulse generator and operative in response to an output pulse from said first pulse generator to open and pass said receiver signal to actuate said second pulse generator.

12. In apparatus for acoustic logging of earth formations surrounding a well bore including a logging tool having a plurality of acoustic transmitters and receivers and suspended in said well bore by conductive cable means extending from the surface of the earth, surface equipment comprising, a master pulse source for generating periodic pulses having a spacing between successive pulses defining a measurement interval, signal generator means for selectively generating during an initial portion each measurement interval a control signal representative of one of a plurality of possible pairs of transmitters and receivers in said tool, programming means for controlling said signal generator means to provide individual control signals in a predetermined order over a plurality of successive measurement intervals, detecting means rendered operative during each measurement cycle after generation of said control signal to receive electrical signals representative of a characteristic of said formations from said tool, means under control of said programming means for generating a single indication having a predetermined relationship to the output of said detector during at least one measurement interval, and means for recording said indication as a function of depth in the well.

13. In apparatus for acoustic logging of earth formations surrounding a well bore including a logging tool having a plurality of acoustic transmitters and receivers and suspended in said well bore by conductive cable means extending from the surface of the earth, surface equipment comprising, a master pulse source for generating periodic pulses having a spacing between successive pulses defining a measurement interval, signal generator means synchronized by said periodic pulses for selectively generating during an initial portion of each measurement interval a control signal representative of one of a plurality of possible pairs of transmitters and receivers in said tool, programming means for controlling said signal generator means to provide individual control signals in predetermined order over a plurality of successive measurement intervals, detecting means rendered operative during each measurement cycle after generation of said control signal to receive electrical signals representative of a characteristic of said formations from said tool, computer means under control of said programming means for repetitively combining in a predetermined manner the successive outputs of said detector over a given number of measurement intervals and providing a single output indication, and means for recording the resultant plurality of output indications as a function of depth in the well.

14. In apparatus for acoustic logging of earth formations surrounding a well bore including a logging tool having a plurality of acoustic transmitters and receivers and suspended in said well bore by conductive cable means extending from the surface of the earth, surface equipment comprising, a master pulse source for generating periodic pulses having a spacing between successive pulses defining a measurement interval, signal generator means synchronized by said periodic pulses for generating during an initial portion of each measurement interval a control signal representative of one of four possible pairs of transmitters and receivers in said tool, programming means for controlling said signal generator means to provide individual control signals in predetermined order over a plurality of successive measurement intervals, detecting means for receiving electrical signals representative of a characteristic of said periodic pulses to render said detecting means operative during each measurement cycle after generation of the corresponding control signal, computer means under control of said programming means for repetitively combining in a predetermined manner up to four successive outputs of said detector over the same number of measurement intervals and providing a single output indication, and means for recording the resultant plurality of output indications as a function of depth in the well.

15. Apparatus according to claim 14 above wherein said programming means includes manually actuatable selector means for simultaneously establishing any one of a plurality of available predetermined orders of control signals for said signal generator means and programming said computer for combining in the predetermined manner the outputs of said detector over the number of measurement intervals corresponding to a complete cycle of control signals.

16. Apparatus for acoustic logging of earth formations surrounding a well bore comprising, a logging tool adapted to be moved through the well bore, a pair of acoustic transmitters and four acoustic receivers mounted in said tool in longitudinally spaced apart relation, said receivers being mounted in said tool between said transmitters, a master pulse source for generating periodic pulses having a spacing between successive pulses defining a measurement interval, means synchronized by said periodic pulses for selecting and rendering operative during each measurement interval one of said transmitters and one of said receivers to derive an electrical indication of an acoustic energy response characteristic of the earth formations surrounding the well bore between said selected transmitter and receiver, said means including programmer means for establishing a plurality of different measurement cycles, each consisting of one or more measurement intervals, and means for selecting the desired measurement cycle and actuating said programmer means to repetitively couple appropriate ones of said transmitters and receivers in accordance with the selected cycle, and means responsive to the electrical indications derived over a plurality of measurement cycles as said logging tool moves through the well bore for providing a record of said acoustic energy response characteristic versus depth in the well.

17. Apparatus for acoustic logging of earth formations surrounding a well bore comprising, a logging tool adapted to be moved through the well bore, a pair of acoustic transmitters and four acoustic receivers mounted in said tool in longitudinally spaced apart relation, said receivers being mounted in said tool between said transmitters, a master pulse source generating periodic pulses having a spacing between successive pulses defining a measurement interval, an output circuit, means synchronized by said periodic pulses for effectively coupling during each measurement interval one of said transmitters and one of said receivers to said output circuit to derive an electrical indication of an acoustic energy response characteristic of the earth formations surrounding the well bore relative to said selected transmitter and receiver, and means coupled to said output circuit for providing a record of said acoustic energy response characteristic vs. depth in the well bore.

References Cited by the Examiner

UNITED STATES PATENTS

| | | | |
|---|---|---|---|
| 2,691,422 | 10/1954 | Summers et al. | 181—.5 |
| 2,708,485 | 5/1955 | Vogel | 181—.5 |
| 3,081,838 | 3/1963 | Platt | 181—.5 |
| 3,093,811 | 6/1963 | Schneider | 340—18 |
| 3,096,502 | 7/1963 | Vogel | 181—.5 |
| 3,207,256 | 9/1965 | Blizard | 340—18 X |
| 3,212,598 | 11/1965 | Anderson | 340—18 X |

BENJAMIN A. BORCHELT, *Primary Examiner.*

R. M. SKOLNIK, *Assistant Examiner.*